US012711894B2

(12) United States Patent
Pyun et al.

(10) Patent No.: US 12,711,894 B2
(45) Date of Patent: Aug. 18, 2026

(54) DRIVING CONTROLLER AND DISPLAY DEVICE INCLUDING THE SAME

(71) Applicant: Samsung Display Co., LTD., Yongin-si (KR)

(72) Inventors: Kihyun Pyun, Yongin-si (KR); Seungho Park, Yongin-si (KR); Dae-Sik Lee, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 18/974,176

(22) Filed: Dec. 9, 2024

(65) Prior Publication Data

US 2025/0292719 A1 Sep. 18, 2025

(30) Foreign Application Priority Data

Jan. 23, 2024 (KR) ........................ 10-2024-0010098

(51) Int. Cl.
*G09G 3/20* (2006.01)
*G09G 3/3233* (2016.01)

(52) U.S. Cl.
CPC ......... *G09G 3/2092* (2013.01); *G09G 3/2007* (2013.01); *G09G 3/3233* (2013.01); (Continued)

(58) Field of Classification Search
CPC .. G09G 3/2092; G09G 3/2007; G09G 3/3233; G09G 3/30; G09G 3/32; G09G 3/3275; G09G 5/10; G09G 2300/0819; G09G 2300/0842; G09G 2310/0243; G09G 2310/0264; G09G 2310/027; G09G 2320/20; G09G 2320/0271; G09G 2320/0285; G09G 2330/021
See application file for complete search history.

(56) References Cited

U.S. PATENT DOCUMENTS 9,257,072 B2 2/2016 Han
9,269,301 B2 2/2016 Lee et al.
(Continued)

FOREIGN PATENT DOCUMENTS

KR 102050518 B1 12/2019
KR 102061554 B1 1/2020
(Continued)

*Primary Examiner* — David Tung
(74) *Attorney, Agent, or Firm* — CANTOR COLBURN LLP

(57) ABSTRACT

A display device includes a display panel including a plurality of pixels, and a driving controller which receives an image signal, and outputs a data signal. The driving controller includes a first power controller which outputs a load of a (N−1)-th image signal based on the image signal, N being a natural number of two or more, a second power controller which outputs a driving voltage of the (N−1)-th image signal based on the image signal, a calculation unit which receives the load, the driving voltage, and a maximum power data value, and outputs a calculation correction value for controlling a driving current of each of the plurality of pixels, and a data output unit which outputs the data signal, which is obtained by adjusting a grayscale level of the image signal, based on the load, the driving voltage, and the calculation correction value.

20 Claims, 14 Drawing Sheets

(52) U.S. Cl.
CPC ............... *G09G 2300/0819* (2013.01); *G09G 2300/0842* (2013.01); *G09G 2330/021* (2013.01)

(56) References Cited

U.S. PATENT DOCUMENTS

| | | | | |
|---|---|---|---|---|
| 11,037,487 | B2 | 6/2021 | Pyun et al. | |
| 11,790,849 | B2 | 10/2023 | Pyun et al. | |
| 2021/0272501 | A1* | 9/2021 | Pyo ...................... | G09G 3/2007 |
| 2022/0215803 | A1* | 7/2022 | Pyun .................... | G09G 3/3258 |
| 2022/0309985 | A1* | 9/2022 | Pyun .................... | G09G 3/2007 |

FOREIGN PATENT DOCUMENTS

| | | | |
|---|---|---|---|
| KR | 1020210008199 | A | 1/2021 |
| KR | 1020220099169 | A | 7/2022 |

* cited by examiner

DRIVING CONTROLLER AND DISPLAY DEVICE INCLUDING THE SAME

This application claims priority to Korean Patent Application No. 10-2024-0010098, filed on Jan. 23, 2024, and all the benefits accruing therefrom under 35 U.S.C. § 119, the content of which in its entirety is herein incorporated by reference.

BACKGROUND

1. Field

Embodiments of the disclosure described herein relate to a display device having improved display quality.

2. Description of the Related Art

There are being developed various electronic devices that are used in a multi-media device such as a television, a mobile phone, a tablet computer, a navigation system, or a game console.

As fields in which these electronic devices are used are diversified, the types of display panels for displaying an image displayed on electronic devices are also diversified.

Nowadays, a display panel includes a light-emitting display panel. The light-emitting display panel may include an organic light-emitting display panel or a quantum dot light-emitting display panel.

SUMMARY

Embodiments of the disclosure provide a display device with improved display quality.

In an embodiment of the disclosure, a display device includes a display panel including a plurality of pixels, and a driving controller that receives an image signal, outputs a data signal, and drives the plurality of pixels. The driving controller includes a first power controller that receives the image signal and outputs a load of a (N−1)-th image signal based on the image signal N being a natural number of two or more, a second power controller that receives the image signal and outputs a driving voltage of the (N−1)-th image signal based on the image signal, a calculation unit that receives the load, the driving voltage, and a maximum power data value, and outputs a calculation correction value for controlling a driving current of each of the plurality of pixels, and a data output unit that outputs the data signal, which is obtained by adjusting a grayscale level of the image signal, based on the load, the driving voltage, and the calculation correction value.

In an embodiment, the second power controller may further receive a driving voltage lookup table and may output the driving voltage based on the driving voltage lookup table.

In an embodiment, the calculation unit may further receive a driving current lookup table including a reference driving current corresponding to the load, and a weighted ratio including a correction ratio corresponding to the load.

In an embodiment, the calculation unit may output the reference driving current based on the driving current lookup table, and the calculation unit may calculate driving power by multiplying the reference driving current and the driving voltage.

In an embodiment, the calculation unit may further calculate allowable driving power by subtracting the driving power from the maximum power data value.

In an embodiment, the calculation unit may further calculate an additional driving current based on a value obtained by dividing the driving voltage from the allowable driving power.

In an embodiment, the calculation unit may extract a correction value based on the additional driving current.

In an embodiment, the calculation unit may further calculate the calculation correction value by multiplying the correction value by the weighted ratio.

In an embodiment, the first power controller may further receive a gain lookup table and the calculation correction value, and may output a final gain based on the gain lookup table and the calculation correction value.

In an embodiment, the first power controller may include a load calculation unit that calculates a sum of all grayscales based on the image signal, a load representative value calculation unit that calculates the load based on the sum of the all grayscales, a gain setting unit that outputs a reference gain based on the load and the gain lookup table, and a gain calculation unit that outputs the final gain by calculating the reference gain and the calculation correction value.

In an embodiment of the disclosure, a driving controller includes a first power controller that receives an image signal and outputs a load of a (N−1)-th image signal based on the image signal, N being a natural number of two or more, a second power controller that receives the image signal and outputs a driving voltage of the (N−1)-th image signal based on the image signal, and a calculation unit that receives the load, the driving voltage, and a maximum power data value and outputs a calculation correction value for controlling a driving current flowing on a display panel.

In an embodiment, the first power controller may receive a gain lookup table and the calculation correction value, and may output a final gain based on the gain lookup table and the calculation correction value.

In an embodiment, the second power controller may further receive a driving voltage lookup table and may output the driving voltage based on the driving voltage lookup table.

In an embodiment, the calculation unit may further receive a driving current lookup table including a driving current value corresponding to the load, and a weighted ratio including a correction ratio corresponding to the load.

In an embodiment, the calculation unit may output the driving current value based on the driving current lookup table, and the calculation unit may calculate driving power by multiplying the driving current value and the driving voltage.

In an embodiment, the calculation unit may further calculate allowable driving power by subtracting the driving power from the maximum power data value.

In an embodiment, the calculation unit may further calculate an additional driving current based on a value obtained by dividing the driving voltage from the allowable driving power.

In an embodiment, the calculation unit may extract a correction value based on the additional driving current.

In an embodiment, the calculation unit may further calculate the calculation correction value by multiplying the correction value by the weighted ratio.

In an embodiment, the driving controller may further include a data output unit. The data output unit may output a data signal obtained by adjusting a grayscale level of the image signal, based on the final gain.

BRIEF DESCRIPTION OF THE DRAWINGS

The above and other embodiments, advantages and features of the disclosure will become apparent by describing in detail embodiments thereof with reference to the accompanying drawings.

DETAILED DESCRIPTION

Figure 1:
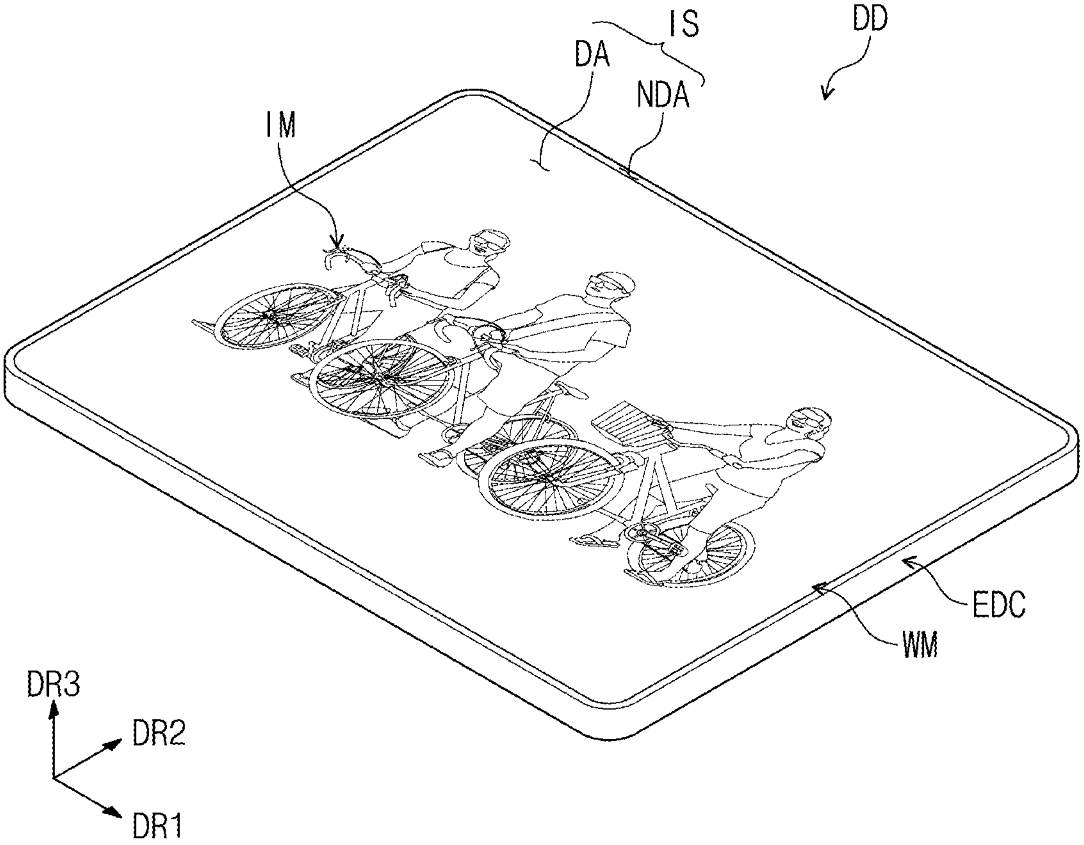
FIG. 1 is a perspective view of an embodiment of a display device, according to the disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

The terms "controller" and "unit" mean a software component or a hardware component that performs a specific function. The hardware component may include, for example, a field-programmable gate array ("FPGA") or an application-specific integrated circuit ("ASIC"). The software component may refer to executable code and/or data used by executable code in an addressable storage medium. Thus, software components may be, for example, object-oriented software components, class components, and working components, and may include processes, functions, properties, procedures, subroutines, program code segments, drivers, firmware, micro-codes, circuits, data, databases, data structures, tables, arrays or variables.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to accompanying drawings.

Figure 2:
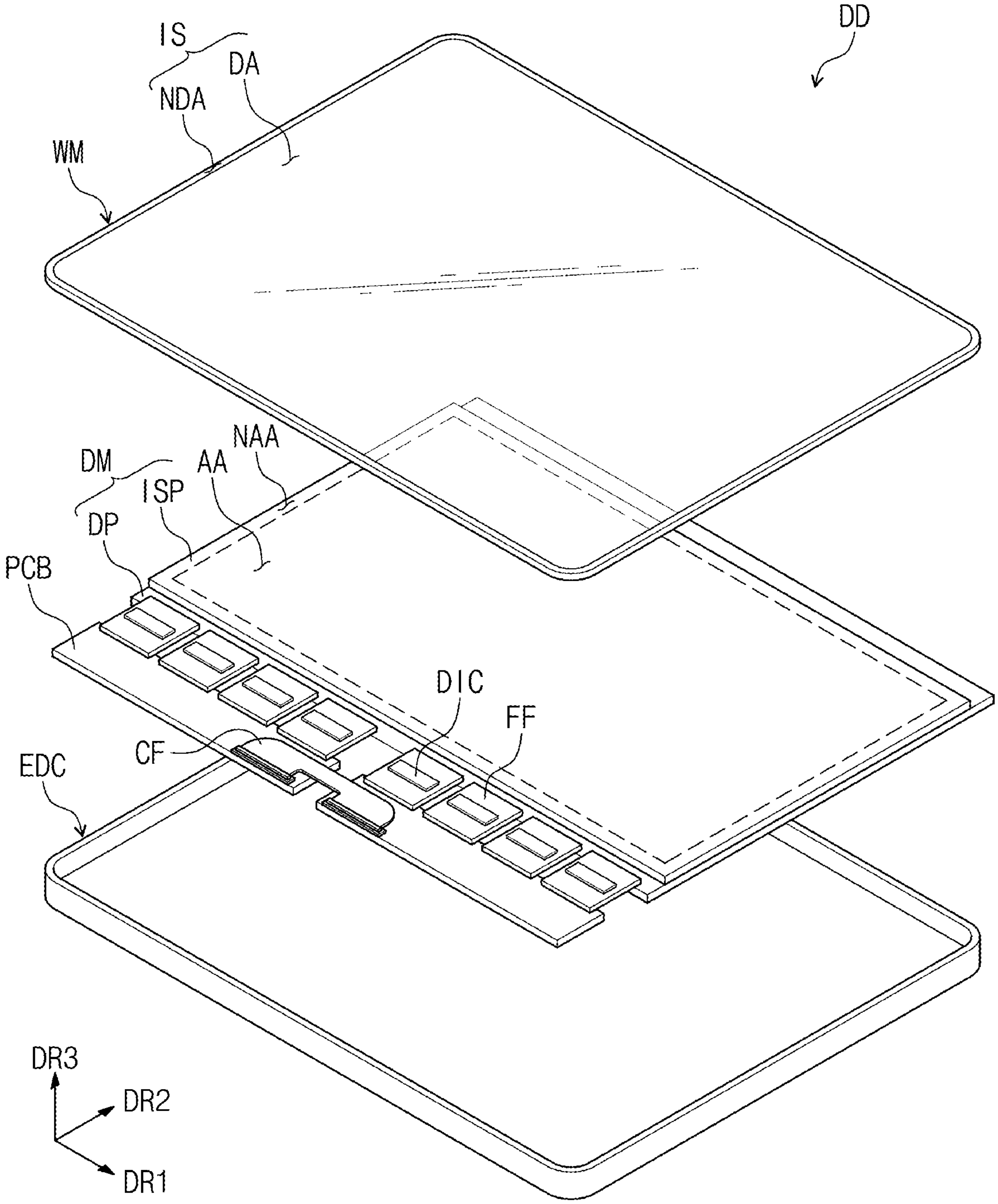
FIG. 2 is an exploded perspective view of an embodiment of a display device, according to the disclosure.

FIG. 1 is a perspective view of an embodiment of a display device, according to the disclosure. FIG. 2 is an exploded perspective view of an embodiment of a display device, according to the disclosure.

Referring to FIGS. 1 and 2, a display device DD may be a device activated depending on an electrical signal. The display device DD in an embodiment of the disclosure may be a small and medium-sized electronic device, such as a mobile phone, a tablet personal computer ("PC"), a notebook computer, a vehicle navigation system, or a game console, as well as a large-sized electronic device, such as a television or a monitor. The above examples are provided only in an embodiment, and it is obvious that the display device DD may be implemented as another type of a display device without departing from the concept of the disclosure. The display device DD is in a shape of a quadrangle, e.g., a rectangle, having a long side in the first direction DR1 and a short side in the second direction DR2 intersecting the first direction DR1. However, the shape of the display device DD is not limited thereto. In an embodiment, the display device DD may be implemented in various shapes, for example. The display device DD may display an image IM on a display surface IS parallel to each of the first direction DR1 and the second direction DR2, so as to face a third direction DR3. The display surface IS on which the image IM is displayed may correspond to a front surface of the display device DD.

In an embodiment, a front surface (or an upper/top surface) and a rear surface (or a lower/bottom surface) of each member are defined based on a direction in which the image IM is displayed. The front surface may be opposite to the rear surface in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. Directions that the first, second, and third directions DR1, DR2, and DR3 indicate may be relative in concept and may be changed to different directions.

The display device DD may sense an external input applied from the outside. The external input may include various types of inputs that are provided from the outside of the display device DD. The display device DD in an embodiment of the disclosure may sense an external input of a user, which is applied from the outside. The external input of the user may be one of various types of external inputs, such as a part of his/her body, light, heat, his/her gaze, and pressure, or any combinations thereof. Also, the display device DD may sense the external input of the user applied to a side surface or a rear surface of the display device DD depending on a structure of the display device DD and is not limited to an embodiment. In an embodiment of the disclosure, an external input may include an input entered through an input device (e.g., a stylus pen, an active pen, a touch pen, an electronic pen, or an E-pen).

The display surface IS of the display device DD may be divided into a display area DA and a non-display area NDA. The display area DA may be an area in which the image IM is displayed. A user perceives (or views) the image IM through the display area DA. In an embodiment, the display area DA is illustrated in the shape of a quadrangle whose vertexes are rounded. However, this is illustrated as an example. The display area DA may have various shapes, not limited to an embodiment.

The non-display area NDA is adjacent to the display area DA. The non-display area NDA may have a given color. The non-display area NDA may surround the display area DA. Accordingly, a shape of the display area DA may be defined substantially by the non-display area NDA. However, this is illustrated as an example. The non-display area NDA may be adjacent to only one side of the display area DA or may be omitted. The display device DD in an embodiment of the disclosure may include various embodiments and is not limited to an embodiment.

As illustrated in FIG. 2, the display device DD may include a display module DM and a window WM disposed on the display module DM. The display module DM may include a display panel DP and an input sensing layer ISP.

In an embodiment of the disclosure, the display panel DP may include a light-emitting display panel. In an embodiment, the display panel DP may be an organic light-emitting display panel, an inorganic light-emitting display panel, or a quantum dot light-emitting display panel, for example. A light-emitting layer of the organic light-emitting display panel may include an organic light-emitting material. A light-emitting layer of the inorganic light-emitting display panel may include an inorganic light-emitting material. A light-emitting layer of the quantum dot light-emitting display panel may include a quantum dot, a quantum rod, or the like.

The display panel DP may output the image IM, and the image IM thus output may be displayed through the display surface IS.

The input sensing layer ISP may be disposed on the display panel DP to sense an external input. The input sensing layer ISP may be directly disposed on the display panel DP. In an embodiment of the disclosure, the input sensing layer ISP may be formed on the display panel DP by a subsequent process. That is, when the input sensing layer ISP is directly disposed on the display panel DP, an inner adhesive film is not interposed between the input sensing layer ISP and the display panel DP. However, the inner adhesive film may be interposed between the input sensing layer ISP and the display panel DP. In this case, the input sensing layer ISP is not manufactured together with the display panel DP through the subsequent processes. That is, the input sensing layer ISP may be manufactured through a process separate from that of the display panel DP and may then be fixed on an upper surface of the display panel DP by the inner adhesive film.

The window WM may include or consist of a transparent material capable of outputting the image IM. In an embodiment, the window WM may include or consist of glass, sapphire, plastic, etc., for example. It is illustrated that the window WM is implemented with a single layer. However, the disclosure is not limited thereto. In an embodiment, the window WM may include a plurality of layers, for example.

Although not illustrated, the non-display area NDA of the display device DD described above may correspond to an area that is defined by printing a material including a given color on one area of the window WM. In an embodiment of the disclosure, the window WM may include a light-blocking pattern for defining the non-display area NDA. The light-blocking pattern that is a colored organic film may be formed, e.g., in a coating manner.

The window WM may be coupled to the display module DM through an adhesive film. In an embodiment of the disclosure, the adhesive film may include an optically clear adhesive ("OCA") film. However, the adhesive film is not limited thereto. In an embodiment, the adhesive film may include a typical adhesive or sticking agent, for example. In an embodiment, the adhesive film may include an optically clear resin ("OCR") or a pressure sensitive adhesive ("PSA") film, for example.

An anti-reflection layer may be further disposed between the window WM and the display module DM. The anti-reflection layer decreases the reflectivity of external light incident from above the window WM. The anti-reflection layer in an embodiment of the disclosure may include a phase retarder and a polarizer. The phase retarder may have a film type or a liquid crystal coating type. The polarizer may also be a polarizer of a film type or a liquid crystal coating type. The film type may include a stretch-type synthetic resin film, and the liquid crystal coating type may include liquid crystals disposed in a given direction. The phase retarder and the polarizer may be implemented with one polarization film.

In an embodiment of the disclosure, the anti-reflection layer may also include color filters. The arrangement of the color filters may be determined in consideration of colors of light generated from a plurality of pixels PX (refer to FIG. 3) included in the display panel DP. In this case, the anti-reflection layer may further include a light-blocking pattern disposed between the color filters.

The display module DM may display the image IM depending on an electrical signal and may transmit/receive information about an external input. The display module DM may be defined by an active area AA and an inactive area NAA. The active area AA may be defined as an area (i.e., an area where the image IM is displayed) through which the image IM is output from the display panel DP. Also, the active area AA may be defined as an area in which the input sensing layer ISP senses an external input applied from the outside. In an embodiment, the active area AA of the display module DM may correspond to (or overlap) at least a part of the display area DA.

The inactive area NAA is adjacent to the active area AA. The inactive area NAA may be an area in which the image IM is not substantially displayed. In an embodiment, the inactive area NAA may surround the active area AA, for example. However, this is illustrated by way of example. The inactive area NAA may be defined in various shapes, not limited to an embodiment. In an embodiment, the inactive area NAA of the display module DM may correspond to (or overlap) at least a part of the non-display area NDA.

The display device DD may further include a plurality of flexible films FF connected to the display panel DP. A driver chip DIC may be disposed (e.g., mounted) on each of the flexible films FF. In an embodiment of the disclosure, a data driver 200 (refer to FIG. 3) may include the plurality of driver chips DIC, and the plurality of driver chips DIC may be respectively disposed (e.g., mounted) on the plurality of flexible films FF.

The display device DD may further include at least one circuit board PCB coupled to the plurality of flexible films FF. FIG. 2 shows that the two circuit boards PCB are provided in the display device DD, but the number of circuit boards PCB is not limited thereto. Two adjacent circuit boards among the circuit boards PCB may be electrically connected to each other by a connection film CF. Also, at least one of the circuit boards PCB may be electrically connected to a main board. A driving controller 100 (refer to FIG. 3) and a voltage generator 300 (refer to FIG. 3) may be disposed on at least one of the circuit boards PCB.

FIG. 2 illustrates a structure in which the driver chips DIC are respectively disposed (e.g., mounted) on the plurality of flexible films FF, but the disclosure is not limited thereto. In an embodiment, the driver chips DIC may be directly disposed (e.g., mounted) on the display panel DP, for example. In this case, a portion of the display panel DP on which the driver chip DIC is disposed (e.g., mounted) may be bent to be disposed on the back surface of the display module DM.

The input sensing layer ISP may be electrically connected to the circuit board PCB through the plurality of flexible films FF. However, the disclosure is not limited thereto. That is, the display module DM may additionally include a separate flexible film for electrically connecting the input sensing layer ISP and the circuit board PCB.

The display device DD further includes a housing EDC for accommodating the display module DM. The housing EDC may be coupled with the window WM to define the exterior appearance of the display device DD. The housing EDC may absorb external shocks and may prevent a foreign material/moisture or the like from being infiltrated into the display module DM such that components accommodated in the housing EDC are protected. In an embodiment of the disclosure, the housing EDC may be provided in the form of a combination of a plurality of accommodating members.

The display device DD in an embodiment may further include an electronic module including various functional modules for operating the display module DM, a power supply module (e.g., a battery) for supplying a power desired for overall operations of the display device DD, a bracket coupled with the display module DM and/or the housing EDC to partition an inner space of the display device DD, etc.

Figure 3:
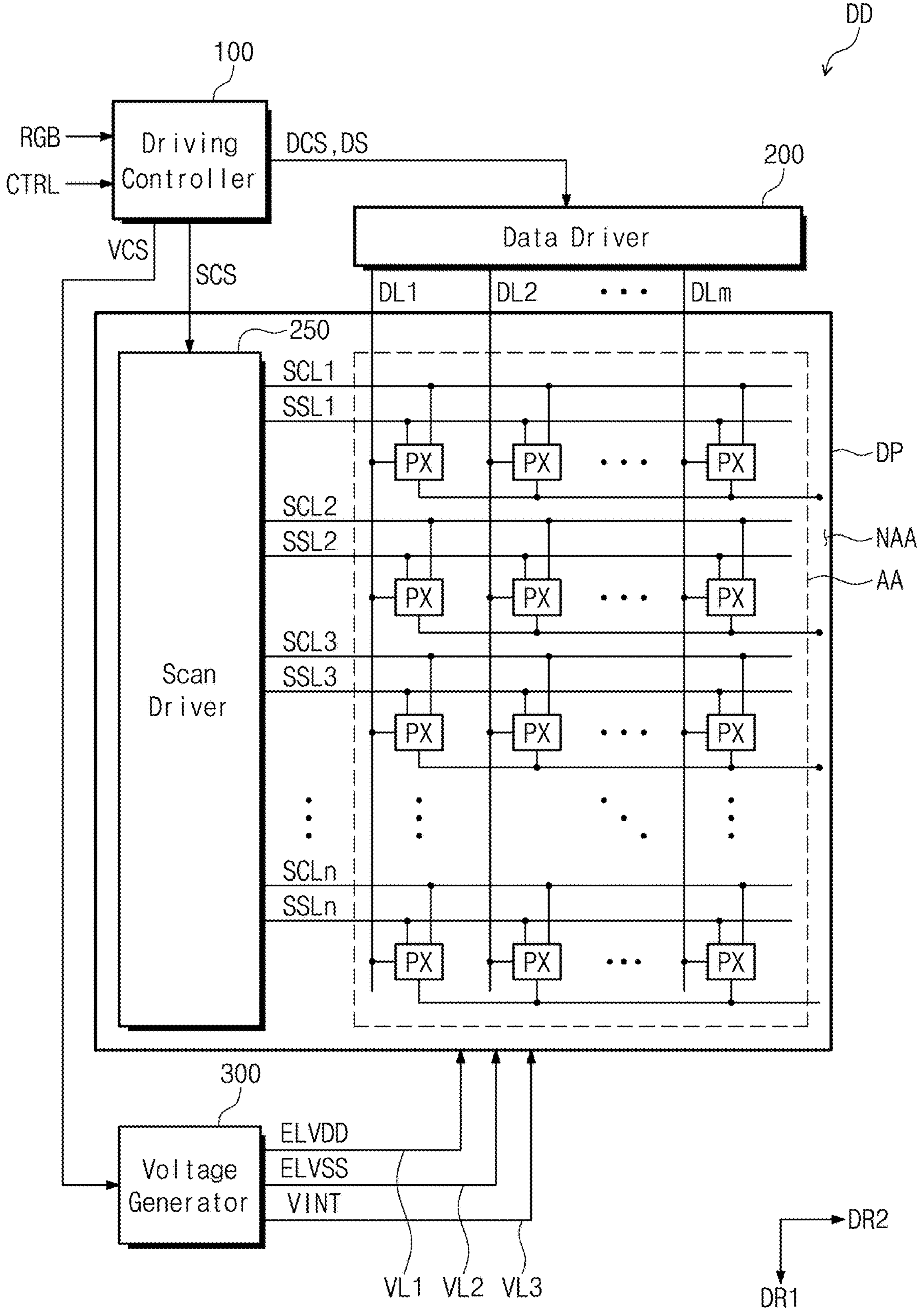
FIG. 3 is a block diagram of an embodiment of a display device, according to the disclosure.

FIG. 3 is a block diagram of an embodiment of a display device, according to the disclosure.

Referring to FIG. 3, the display device DD may include a driving controller 100, a data driver 200, a scan driver 250, a voltage generator 300, and a display panel DP.

The driving controller 100 may receive an image signal RGB and a control signal CTRL from a main controller (e.g., a microcontroller). The driving controller 100 may output a data signal DS by adjusting the grayscale level of the image signal RGB based on a final gain FGL[N−1] (refer to FIG. 5) where 'N' may be a natural number of 2 or more. The plurality of pixels PX may be driven based on the data signal DS. In other words, the driving controller 100 may drive the plurality of pixels PX.

The driving controller 100 may generate a scan control signal SCS and a data control signal DCS based on the control signal CTRL. The driving controller 100 may output a voltage control signal VCS for controlling the voltage generator 300.

The data driver 200 may receive the data control signal DCS and the data signal DS from the driving controller 100. The data driver 200 converts the data signal DS into pixel data signals Di (refer to FIG. 4), and outputs the pixel data signals Di (refer to FIG. 4) to a plurality of data lines DL1 to DLm described later. ('m' is a natural number greater than 1). The pixel data signals are analog voltages corresponding to the grayscale value of the data signal DS. The data driver 200 may be placed within driver chips DIC (refer to FIG. 2).

The display panel DP may be electrically connected to the driving controller 100, the data driver 200, and the voltage generator 300. The display panel DP may include the scan driver 250 and the plurality of pixels PX.

The scan driver 250 may receive the scan control signal SCS from the driving controller 100. The scan driver 250 may output first scan signals to the plurality of first scan lines SCL1 to SCLn ('n' is a natural number greater than 1), which will be described later, in response to the scan control signal SCS and may output second scan signals to the plurality of second scan lines SSL1 to SSLn, which will be described later.

The display panel DP may include the plurality of first scan lines SCL1 to SCLn, the plurality of second scan lines SSL1 to SSLn, the plurality of data lines DL1 to DLm, and the plurality of pixels PX.

The display panel DP may be divided into the active area AA and the inactive area NAA. The plurality of pixels PX may be disposed in the active area AA. The scan driver 250 may be disposed in the inactive area NAA.

The plurality of first scan lines SCL1 to SCLn and the plurality of second scan lines SSL1 to SSLn may extend in parallel with the second direction DR2. The plurality of first scan lines SCL1 to SCLn and the plurality of second scan lines SSL1 to SSLn may be disposed spaced from each other in the first direction DR1.

Each of the plurality of data lines DL1 to DLm may extend in parallel with the first direction DR1 from the data driver 200. The plurality of data lines DL1 to DLm may be disposed spaced from each other in the second direction DR2.

The plurality of pixels PX may be electrically connected to the first scan lines SCL1 to SCLn, the second scan lines SSL1 to SSLn, and the data lines DL1 to DLm. In an embodiment, the first row of pixels may be connected to the scan lines SCL1 and SSL1, and the second row of pixels may be connected to scan lines SCL2 and SSL2, for example. Moreover, the first column of pixels may be connected to the data line DL1, and the second column of pixels may be connected to the data line DL2.

In an embodiment, the scan driver 250 may be placed on a first side of the display panel DP. The scan driver 250 may be placed adjacent to the first side of the active area AA, but is not limited thereto. In an embodiment, the scan driver 250 may be placed adjacent to the first side and a second side of the active area AA, for example. In an embodiment, the scan driving circuit disposed adjacent to the first side of the active area AA may provide the first scan signals to the first scan lines SCL1 to SCLn, and the scan driving circuit disposed adjacent to the second side of the active area AA may provide the second scan signals to the second scan lines SSL1 to SSLn, for example.

Each of the plurality of pixels PX receives a first driving voltage (or driving voltage) ELVDD, a second driving voltage ELVSS, and an initialization voltage VINT.

The voltage generator 300 may generate voltages desired to operate the display panel DP. In an embodiment of the disclosure, the voltage generator 300 may generate the first driving voltage ELVDD, the second driving voltage ELVSS, and the initialization voltage VINT, which are desired for operations of the display panel DP.

The first driving voltage ELVDD may be provided to the display panel DP through a first voltage line VL1 (or a driving voltage line). The second driving voltage ELVSS may be provided to the display panel DP through a second voltage line VL2. The initialization voltage VINT may be provided to the display panel DP through a third voltage line VL3.

As well as the first driving voltage ELVDD, the second driving voltage ELVSS, and the initialization voltage VINT, the voltage generator 300 may further generate various voltages desired for operations of the data driver 200 and the scan driver 250.

Figure 4:
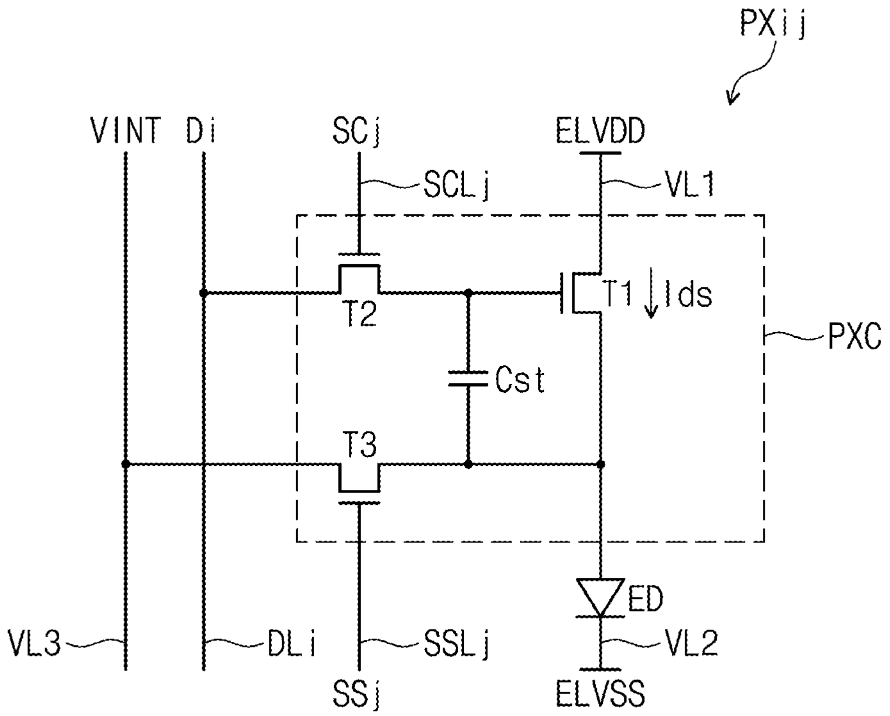
FIG. 4 is an equivalent circuit diagram of an embodiment of a pixel, according to the disclosure.

FIG. 4 is an equivalent circuit diagram of an embodiment of a pixel, according to the disclosure.

FIG. 4 illustrates an equivalent circuit diagram of a pixel PXij connected to an i-th data line DLi among the plurality of data lines DL1 to DLm, a j-th first scan line SCLj among the plurality of first scan lines SCL1 to SCLn, and a j-th second scan line SSLj among the plurality of second scan lines SSL1 to SSLn, which are illustrated in FIG. 3.

Each of the plurality of pixels PX (refer to FIG. 3) shown in FIG. 3 may have substantially the same circuit configuration as the equivalent circuit of the pixel PXij shown in FIG. 4.

Referring to FIG. 4, the pixel PXij may include a light-emitting element ED and a pixel circuit unit PXC that controls emission of the light-emitting element ED. The pixel circuit unit PXC may include a plurality of transistors and a capacitor. The pixel circuit unit PXC may include transistors formed through the same process as the scan driver 250 (refer to FIG. 3). In an embodiment, the light-emitting element ED may be an organic light-emitting diode. However, the disclosure is not limited thereto. In an embodiment, the light-emitting element ED may include quantum dots, quantum rods, micro-light-emitting diodes ("micro-LEDs"), and nano-light-emitting diodes ("nano-LEDs"), for example.

The pixel circuit unit PXC may include at least one transistor, which is electrically connected to the light-emitting element ED and which is used to provide a current corresponding to the pixel data signal Di delivered from the data line DLi to the light-emitting element ED. In an embodiment of the disclosure, the pixel circuit unit PXC of the pixel PXij includes a first transistor T1, a second transistor T2, a third transistor T3, and a capacitor Cst. Each of the first to third transistors T1 to T3 may be an N-type transistor by an oxide semiconductor as a semiconductor layer. However, the disclosure is not limited thereto. In an embodiment, each of the first to third transistors T1 to T3 may be a P-type transistor having a low-temperature polycrystalline silicon ("LTPS") semiconductor layer, for example. In an alternative embodiment, at least one of the first to third transistors T1 to T3 may be an N-type transistor and the others thereof may be P-type transistors.

The first scan line SCLj may deliver the first scan signal SCj, and the second scan line SSLj may deliver the second scan signal SSj. The data line DLi transfers the pixel data signal Di. The pixel data signal Di may have a voltage level corresponding to the data signal DS (refer to FIG. 3).

The first driving voltage ELVDD and the initialization voltage VINT may be delivered to the pixel circuit unit PXC through the first voltage line VL1 and the third voltage line VL3, respectively. The second driving voltage ELVSS may be delivered to a cathode (or a second terminal) of the light-emitting element ED through the second voltage line VL2.

The first transistor T1 includes a first electrode connected to the first voltage line VL1, a second electrode electrically connected to an anode (or a first terminal) of the light-emitting element ED, and a gate electrode connected to one end of the capacitor Cst. The first transistor T1 may supply a driving current Ids to the light-emitting element ED in response to the pixel data signal Di delivered through the data line DLi depending on a switching operation of the second transistor T2. The pixel data signal Di may adjust the magnitude of the driving current Ids.

The second transistor T2 includes a first electrode connected to the data line DLi, a second electrode connected to the gate electrode of the first transistor T1, and a gate electrode connected to the first scan line SCLj. The second transistor T2 may be turned on in response to the first scan signal SCj received through the first scan line SCLj so as to deliver the data signal Di delivered through the data line DLi to the gate electrode of the first transistor T1.

The third transistor T3 includes a first electrode connected to the third voltage line VL3, a second electrode connected to the anode of the light-emitting element ED, and a gate electrode connected to the second scan line SSLj. The third transistor T3 may be turned on in response to the second scan signal SSj received through the second scan line SSLj so as to deliver the initialization voltage VINT to the anode of the light-emitting element ED.

As described above, one end of the capacitor Cst is connected to the gate electrode of the first transistor T1, and an opposite end of the capacitor Cst is connected to the second electrode of the first transistor T1. The structure of the pixel PXij in an embodiment is not limited to the structure illustrated in FIG. 4. The number of transistors included in the pixel PXij, the number of capacitors, and the connection relationship may be modified in various manners.

Figure 5:
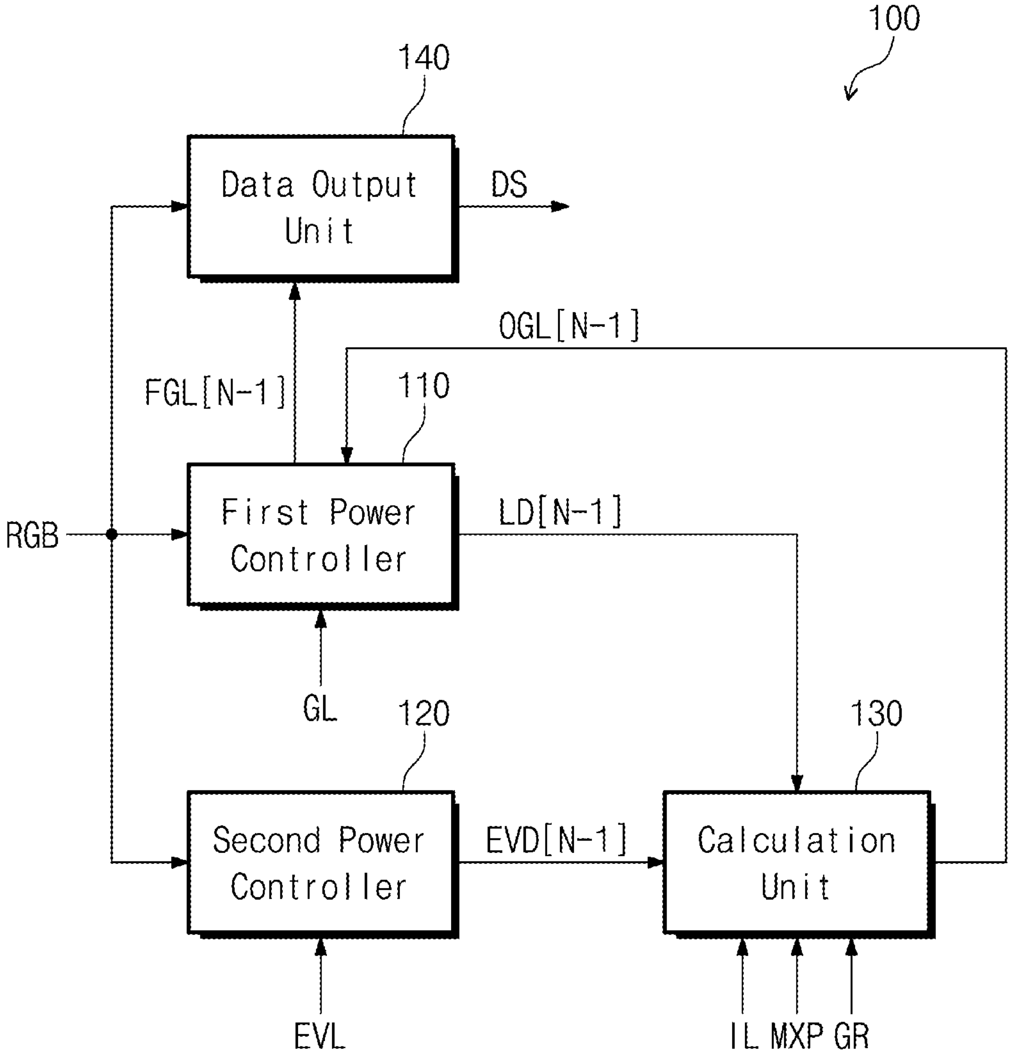
FIG. 5 is a block diagram showing a configuration of a driving controller, according to the disclosure.

FIG. 5 is a block diagram showing an embodiment of a configuration of a driving controller, according to the disclosure.

Referring to FIG. 5, the driving controller 100 may include a first power controller 110, a second power controller 120, a calculation unit 130, and a data output unit 140. The calculation unit 130 may be also referred to as a calculator 130 or a calculation circuit 130. The data output unit 140 may be also referred to as a data output circuit 140.

The first power controller 110 may receive the image signal RGB and a gain lookup table GL of an (N−1)-th frame. The image signal RGB may be input in units of frame. The first power controller 110 may calculate and output a load LD[N−1] of an (N−1)-th image signal based on the image signal RGB. The (N−1)-th image signal may refer to the image signal RGB of the (N−1)-th frame. The first power controller 110 may output a final gain FGL[N−1] for adjusting the grayscale of the image signal RGB based on a calculation correction value OGL[N−1] received from the calculation unit 130 and the gain lookup table GL, which will be described later. The driving current Ids (refer to FIG. 4) of each of the plurality of pixels PX (refer to FIG. 3) may be controlled based on the final gain FGL[N−1]. In other words, the driving current Ids (refer to FIG. 4) of each of the plurality of pixels PX (refer to FIG. 3) may be controlled based on the calculation correction value OGL[N−1]. This will be described later.

The second power controller 120 may receive the image signal RGB of the (N−1)-th frame and a driving voltage lookup table EVL. The image signal RGB may be input in units of frame. The driving voltage lookup table EVL may be a lookup table in which the grayscale of the image signal RGB and the driving voltage for each load are stored. The driving voltage lookup table EVL may be stored in a memory included in the driving controller 100. The second power controller 120 may output a driving voltage EVD[N−1] of the (N−1)-th image signal based on the image signal RGB of the (N−1)-th frame and the driving voltage lookup table EVL. In other words, the driving voltage EVD[N−1] may be a value obtained by outputting a driving voltage corresponding to the image signal RGB of the (N−1)-th frame based on the driving voltage lookup table EVL.

In an embodiment of the disclosure, the plurality of pixels PX (refer to FIG. 3) may receive the first driving voltage ELVDD (refer to FIG. 3) corresponding to the driving voltage EVD[N−1] from the voltage generator 300 (refer to FIG. 3). In an embodiment, when a load is relatively high, the second power controller 120 may output the driving voltage EVD[N−1] with a relatively low level; when the load has a relatively intermediate level, the second power controller 120 may output the driving voltage EVD[N−1] with an intermediate level; and, when the load is relatively low, the second power controller 120 may output the driving voltage EVD[N−1] with a relatively high level, for example. In other words, the second power controller 120 may output the driving voltage EVD[N−1] appropriate depending on a load and grayscale. The first driving voltage ELVDD (refer to FIG. 3) may reduce power consumption by varying the voltage level of the first driving voltage ELVDD (refer to FIG. 3) based on the driving voltage EVD[N−1]. Accordingly, the display device DD (refer to FIG. 1) having improved reliability may be provided.

The calculation unit 130 may be electrically connected to each of the first power controller 110 and the second power controller 120.

The calculation unit 130 receives the load LD[N−1], the driving voltage EVD[N−1], a maximum power data value MXP, a driving current lookup table IL, and a weighted ratio GR.

The maximum power data value MXP may include the maximum power value capable of driving the display panel DP (refer to FIG. 3).

The weighted ratio GR may include a correction ratio corresponding to the load LD[N−1]. In an embodiment, the correction ratio may be a weight for calculating the final gain FGL[N−1] by multiplying the correction ratio by the calculation correction value OGL[N−1], for example.

The driving current lookup table IL may include a reference driving current ID[N−1] (refer to FIG. 8) corresponding to the load LD[N−1]. The calculation unit 130 may output the reference driving current ID[N−1] (refer to FIG. 8) based on the driving current lookup table IL and the load LD[N−1].

The calculation unit 130 may calculate driving power PW[N−1] (refer to FIG. 9) by multiplying the reference driving current ID[N−1] (refer to FIG. 8) and the driving voltage EVD[N−1]. The calculation unit 130 may calculate allowable driving power by subtracting the driving power PW[N−1] (refer to FIG. 9) from the maximum power data value MXP. The calculation unit 130 may calculate an additional driving current AID[N−1] (refer to FIG. 10) based on a value obtained by dividing the driving voltage EVD [N−1] by the allowable driving power. The calculation unit 130 may extract a correction value CV[N−1] (refer to FIG. 11) based on the additional driving current AID[N−1] (refer to FIG. 10). The calculation unit 130 may calculate the calculation correction value OGL[N−1] by multiplying the correction value CV[N−1] (refer to FIG. 11) by the weighted ratio GR. The calculation unit 130 may transmit the calculation correction value OGL[N−1] to the first power controller 110. This will be described later.

The data output unit 140 may receive the image signal RGB of the N-th frame and the final gain FGL[N−1]. The data output unit 140 may output the data signal DS of the N-th frame obtained by adjusting the grayscale level of the image signal RGB of the N-th frame based on the final gain FGL[N−1].

In an embodiment of the disclosure, the data signal DS of the N-th frame may be transmitted to the data driver 200 (refer to FIG. 3) to generate the pixel data signal Di (refer to FIG. 4). The pixel data signal Di (refer to FIG. 4) may control the magnitude of the driving current Ids (refer to FIG. 4). In other words, the magnitude of the driving current Ids (refer to FIG. 4) may be adjusted through the data signal DS adjusted by the final gain FGL[N−1]. The driving current Ids (refer to FIG. 4) adjusted through the final gain FGL [N−1] may maximally utilize the power of the display panel DP (refer to FIG. 3). Accordingly, the brightness of the display panel DP (refer to FIG. 3) may be improved. Accordingly, the display device DD (refer to FIG. 1) with improved display quality may be provided.

Figure 6:
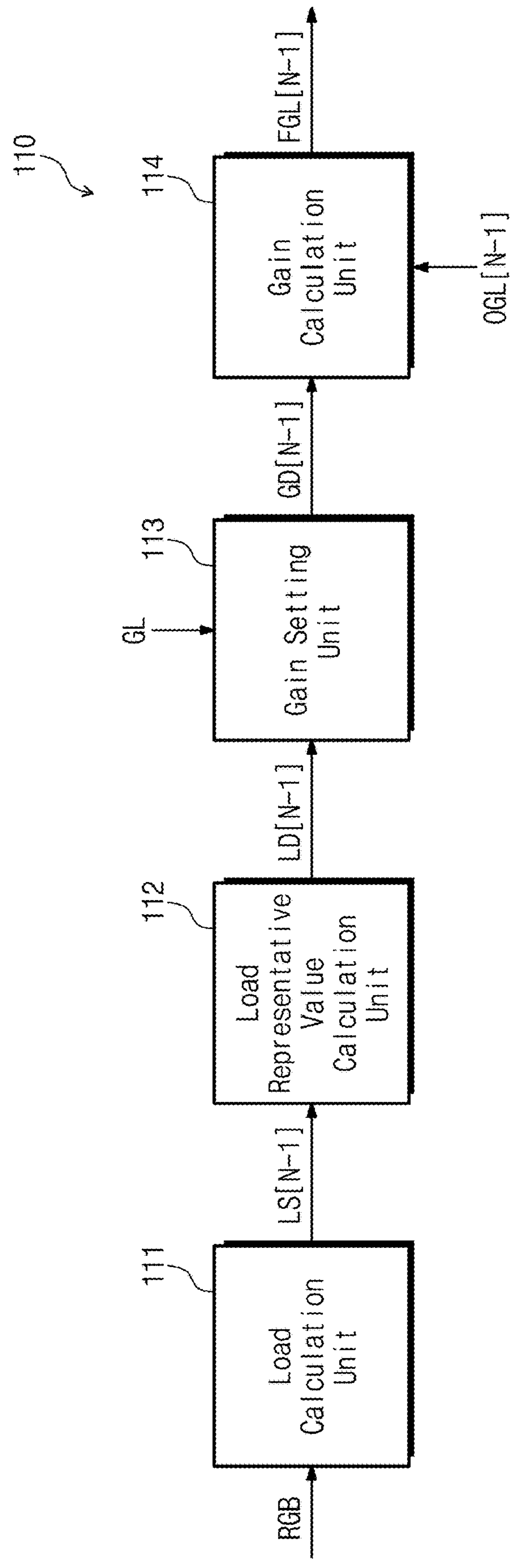
FIG. 6 is a block diagram of a first power controller, according to the disclosure.

FIG. 6 is a block diagram of an embodiment of a first power controller, according to the disclosure.

Referring to FIG. 6, the first power controller 110 may include a load calculation unit 111, a load representative value calculation unit 112, a gain setting unit 113, and a gain calculation unit 114. The load calculation unit 111 may be also referred to as a load calculator 111 or a load calculation circuit 111. The load representative value calculation unit 112 may be also referred to as a load representative value calculator 112 or a load representative value calculation circuit 112. The gain setting unit 113 may be also referred to as a load setting circuit 113. The gain calculation unit 114 may be also referred to as a gain calculator 114 or a gain calculation circuit 114.

The load calculation unit 111 may receive the image signal RGB of the (N−1)-th frame. The image signal RGB may be input in units of frame. The load calculation unit 111 may calculate a sum LS[N−1] of all grayscales of the image signal RGB of the (N−1)-th frame. In an embodiment, the display panel DP (refer to FIG. 3) may be divided into a plurality of blocks, for example. The load calculation unit 111 may calculate the sum of the grayscales of each block. The load calculation unit 111 may calculate the sum LS[N−1] of all grayscales of the image signal RGB of the (N−1)-th frame by adding the sum of the grayscales of each block.

The load representative value calculation unit 112 may calculate the load LD[N−1] of the image signal RGB of the (N−1)-th frame based on the sum LS[N−1] of all grayscales of the image signal RGB of the (N−1)-th frame. The load LD[N−1] may have a value between 0% and 100%. The plurality of light-emitting elements ED (refer to FIG. 4) may operate as a load to drive the display panel DP (refer to FIG. 3). As the number of driven light-emitting elements ED (refer to FIG. 4) increases, the load may increase. In an embodiment, when the image signal RGB represents a full black (e.g., 0 grayscale) image, the load LD[N−1] may be 0%, for example. When the image signal RGB of the (N−1)-th frame represents a full white (e.g., 255 grayscale) image, the load LD[N−1] may be 100%.

The load representative value calculation unit 112 may output the load LD[N−1] to the gain setting unit 113 and the calculation unit 130 (refer to FIG. 5).

The gain setting unit 113 may receive the load LD[N−1], and the gain lookup table GL in which the gain for each load of the image signal RGB is stored. To maintain or reduce the grayscale of the image signal RGB, the gain lookup table GL may have a value less than or equal to 1.

The gain setting unit 113 may output a reference gain GD[N−1] based on the load LD[N−1] and the gain lookup table GL. The reference gain GD[N−1] may be a value of the gain lookup table GL output based on the load LD[N−1]. In an embodiment, when the reference gain GD[N−1] is 0.5, the grayscale of the image signal RGB may be reduced by half, for example.

The gain calculation unit 114 may output the final gain FGL[N−1] by calculating the reference gain GD[N−1] and the calculation correction value OGL[N−1]. The calculation correction value OGL[N−1] may be generated based on the driving voltage (EVD[N−1], refer to FIG. 5) in the calculation unit 130 (refer to FIG. 5). The gain calculation unit 114 may receive the calculation correction value OGL[N−1] from the calculation unit 130 (refer to FIG. 5). To maintain or reduce the grayscale of the image signal RGB, the final gain FGL[N−1] may have a value smaller than or equal to 1. In an embodiment, when the final gain FGL[N−1] is 0.5, the grayscale of the image signal RGB may be reduced by half, for example.

A delay of one frame may occur such that the first power controller 110 generates the final gain FGL[N−1]. That is, the final gain FGL[N−1] generated based on the load LD[N−1] of the (N−1)-th image signal and the driving voltage EVD[N−1] of the (N−1)-th image signal.

Figure 7:
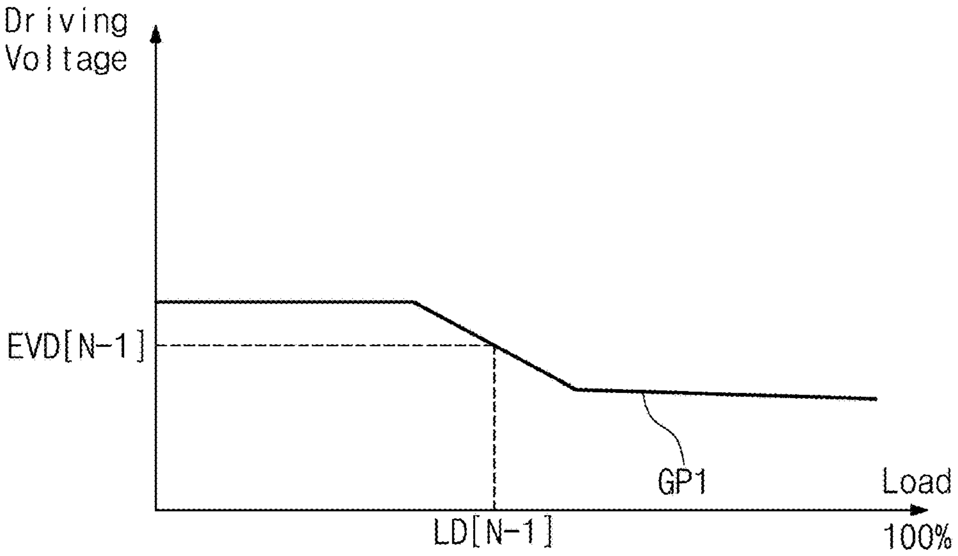
FIG. 7 is a graph showing an embodiment of a driving voltage, according to a load according to the disclosure.

FIG. 7 is a graph showing an embodiment of a driving voltage, according to a load according to the disclosure.

In FIG. 7, a horizontal axis may represent a load applied to drive the display panel DP (refer to FIG. 3), and a vertical axis may represent the first driving voltage ELVDD (refer to FIG. 4) provided to the pixel PXij (refer to FIG. 4).

Referring to FIGS. 5 and 7, the second power controller 120 may calculate the load LD[N−1] from the image signal RGB of the (N−1)-th frame, and may output the driving voltage EVD[N−1] of the (N−1)-th frame based on a first graph GP1 and the load LD[N−1].

The first graph GP1 may represent the driving voltage EVD[N−1] according to the load LD[N−1]. The first graph GP1 may correspond to the driving voltage lookup table EVL. The load LD[N−1] may have a value from 0% to 100%. The level of the driving voltage EVD[N−1] may vary depending on a value of the load LD[N−1].

Figure 8:
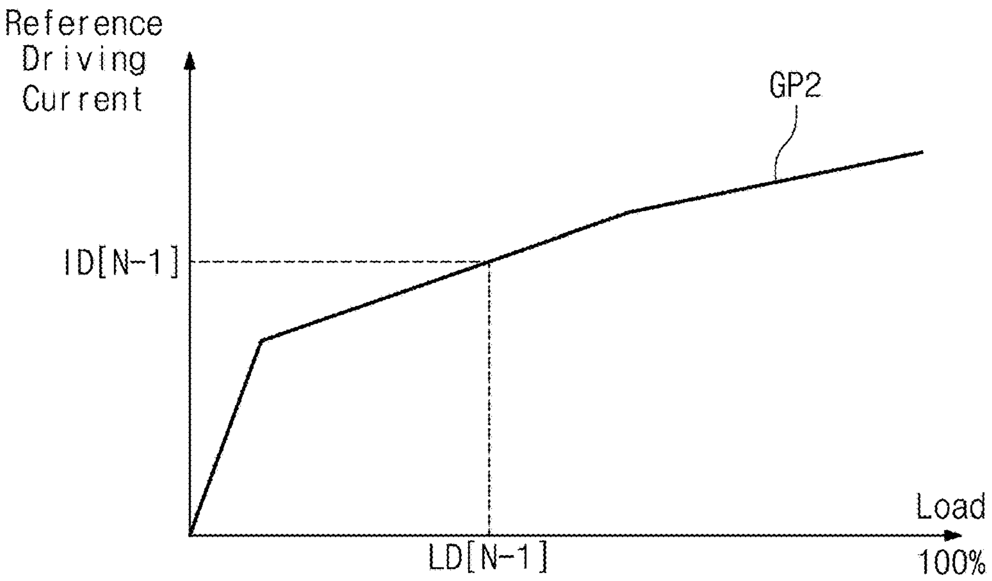
FIG. 8 is a graph showing a reference driving current according to a load, according to the disclosure.

FIG. 8 is a graph showing an embodiment of a reference driving current according to a load, according to the disclosure.

In FIG. 8, a horizontal axis may represent a load applied to drive the display panel DP (refer to FIG. 3), and a vertical axis may represent a reference driving current. Before being corrected by the data output unit 140 (refer to FIG. 5), the reference driving current may refer to a current to be provided to the pixel PXij (refer to FIG. 4).

Referring to FIGS. 5 and 8, the calculation unit 130 may receive the load LD[N−1] from the first power controller 110, and may output the reference driving current ID[N−1] of the (N−1)-th frame based on a second graph GP2 and the load LD[N−1].

The second graph GP2 may represent the reference driving current ID[N−1] according to the load LD[N−1]. The second graph GP2 may correspond to the driving current lookup table IL. The magnitude of the reference driving current ID[N−1] may vary depending on a value of the load LD[N−1].

Figure 9:
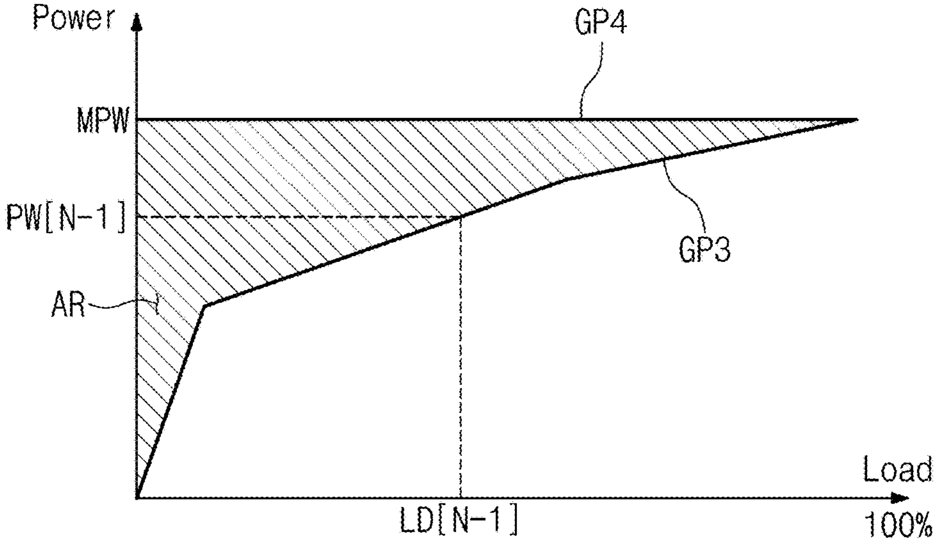
FIG. 9 is a graph showing an embodiment of a maximum power data value, driving power, and allowable driving power according to a load, according to the disclosure.

FIG. 9 is a graph showing an embodiment of a maximum power data value, driving power, and allowable driving power according to a load, according to the disclosure.

In FIG. 9, a horizontal axis may represent a load applied to drive the display panel DP (refer to FIG. 3), and a vertical axis may represent power of the display panel DP (refer to FIG. 3).

Referring to FIGS. 5 and 9, the calculation unit 130 may calculate driving power PW[N−1] by multiplying the driving voltage EVD[N−1] (refer to FIG. 7) and the reference driving current ID[N−1] (refer to FIG. 8).

A third graph GP3 may represent the driving power PW[N−1] according to the load LD[N−1]. The magnitude of the driving power PW[N−1] may vary depending on a value of the load LD[N−1]. The third graph GP3 may be calculated by multiplying the first graph GP1 and the second graph GP2. In other words, the driving power PW[N−1] may be a value calculated by multiplying the driving voltage EVD[N−1] (refer to FIG. 7) and the reference driving current ID[N−1] (refer to FIG. 8).

A fourth graph GP4 may represent the maximum power data value MXP. The maximum power data value MXP may have the same value regardless of the magnitude of the load LD[N−1]. In an embodiment, the maximum power data value MXP may be maximum power MPW, for example. The maximum power MPW may be the maximum power value capable of driving the display panel DP (refer to FIG. 3).

The calculation unit 130 may calculate allowable driving power by subtracting the driving power PW[N−1] from the maximum power data value MXP. The value obtained by integrating the allowable driving power may be also referred to as a "power area AR". In other words, the calculation unit 130 may calculate the power area AR. The power area AR may be an area obtained by subtracting the driving power PW[N−1] from the maximum power data value MXP, may indicate the allowable power at which the display panel DP (refer to FIG. 3) is capable of being additionally used.

Figure 10:
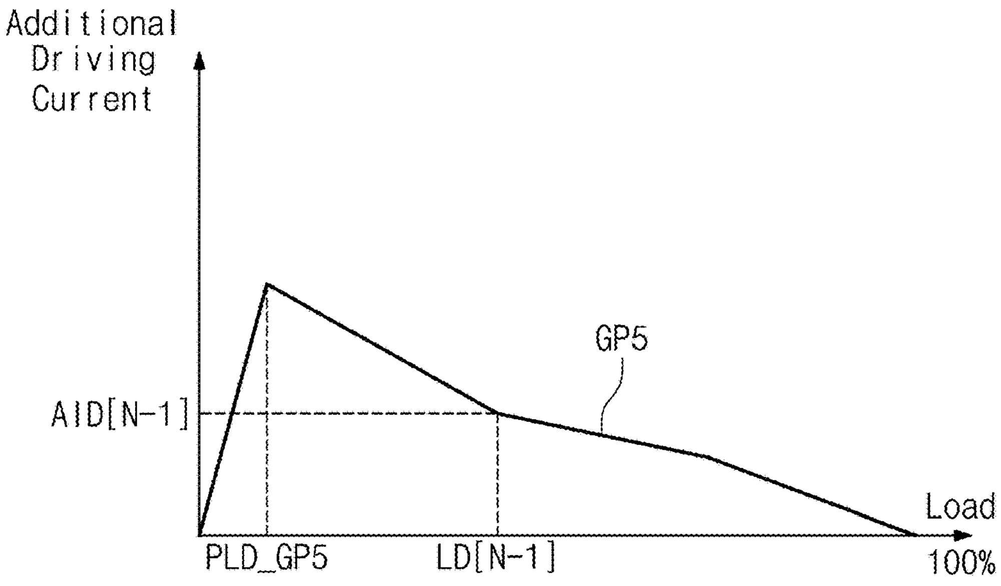
FIG. 10 is a graph showing an embodiment of an additional driving current according to a load, according to the disclosure.

FIG. 10 is a graph showing an embodiment of an additional driving current according to a load, according to the disclosure.

In FIG. 10, a horizontal axis may represent a load applied to drive the display panel DP (refer to FIG. 3), and a vertical axis may represent an additional driving current calculated in the calculation unit 130 (refer to FIG. 5).

Referring to FIGS. 5 and 10, the calculation unit 130 may calculate an additional driving current AID[N−1] based on a value obtained by dividing the driving voltage EVD[N−1] (refer to FIG. 7) by allowable driving power.

A fifth graph GP5 may represent the additional driving current AID[N−1] according to the load LD[N−1]. The magnitude of the additional driving current AID[N−1] may vary depending on a value of the load LD[N−1]. In an embodiment, in FIG. 10, the additional driving current AID[N−1] may increase up to a predetermined load PLD_GP5 and then may decrease after the predetermined load, for example.

Figure 11:
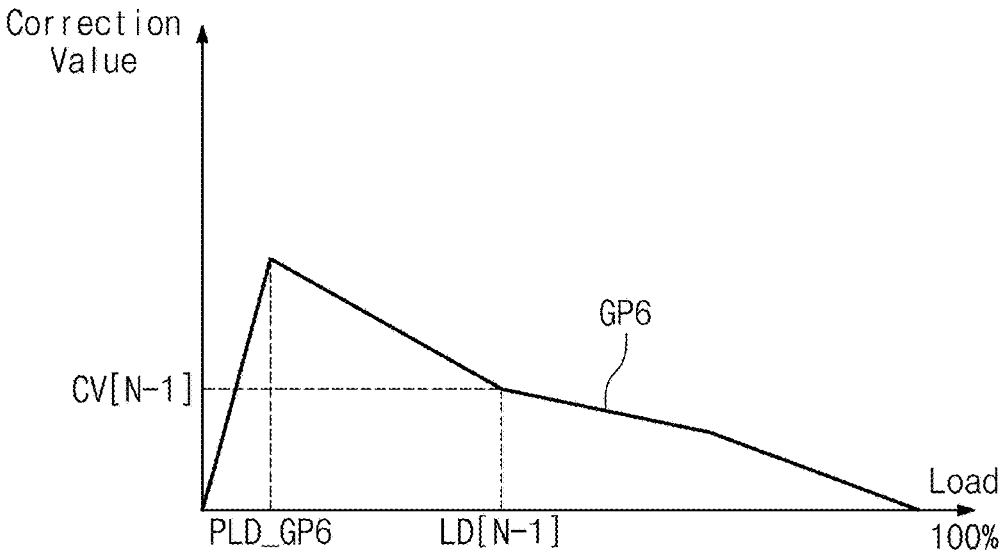
FIG. 11 is a graph showing an embodiment of a correction value according to a load, according to the disclosure

FIG. 11 is a graph showing an embodiment of a correction value according to a load, in an embodiment of the disclosure In FIG. 11, a horizontal axis may represent a load applied to drive the display panel DP (refer to FIG. 3), and a vertical axis may represent a correction value calculated in the calculation unit 130 (refer to FIG. 5).

Referring to FIGS. 5 and 11, the calculation unit 130 may extract the correction value CV[N−1] based on the calculated additional driving current AID[N−1] (refer to FIG. 10). In an embodiment, the correction value CV[N−1] may be proportional to the additional driving current AID[N−1] (refer to FIG. 10), for example.

A sixth graph GP6 may represent the correction value CV[N−1] according to the load LD[N−1]. The magnitude of the correction value CV[N−1] may vary depending on a value of the load LD[N−1]. In an embodiment, in FIG. 11, the correction value CV[N−1] may increase up to a predetermined load PLD_GP6 and then may decrease after the predetermined load PLD_GP6, for example.

Figure 12:
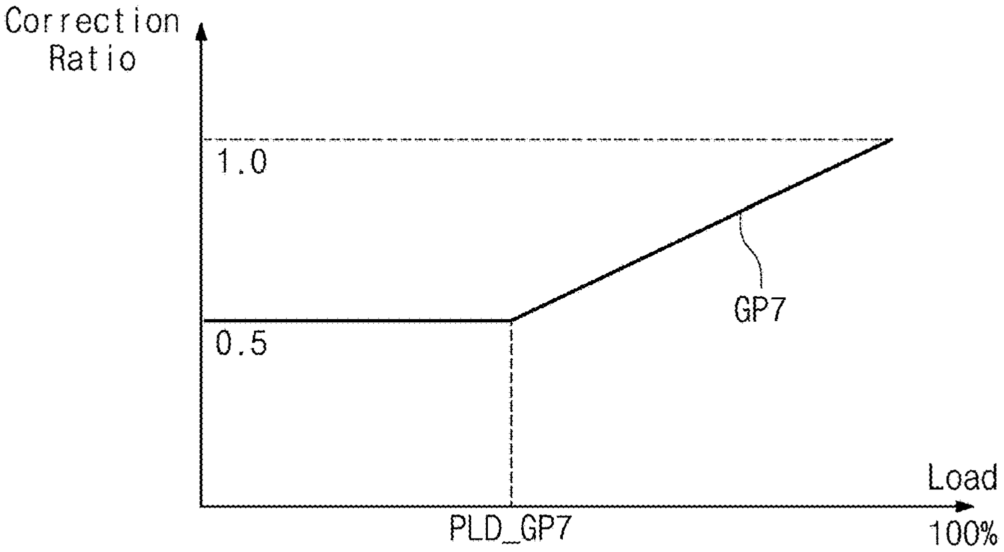
FIG. 12 is a graph showing an embodiment of a weighted ratio according to a load, according to the disclosure.

FIG. 12 is a graph showing an embodiment of a weighted ratio according to a load, according to the disclosure.

In FIG. 12, a horizontal axis may represent a load applied to drive the display panel DP (refer to FIG. 3), and a vertical axis may represent a correction ratio applied for each load.

Referring to FIGS. 5 and 12, a seventh graph GP7 may represent the correction ratio according to the load LD[N−1]. The seventh graph GP7 may correspond to the weighted ratio GR (refer to FIG. 5). The weighted ratio GR may include the correction ratio corresponding to the load LD[N−1]. The magnitude of the correction ratio may vary depending on a value of the load LD[N−1]. In an embodiment, in FIG. 12, the correction ratio has a value of 0.5 up to a predetermined load PLD_GP7, increases linearly after the predetermined load PLD_GP7, and may have a value of 1 when the load value is 100%, for example.

Figure 13:
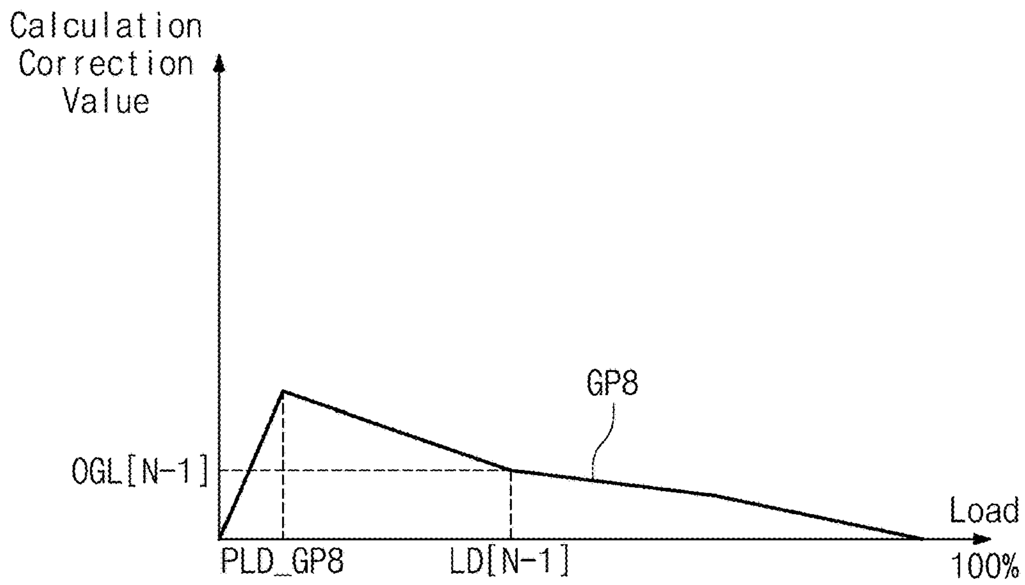
FIG. 13 is a graph showing an embodiment of a calculation correction value according to a load, according to the disclosure.

FIG. 13 is a graph showing an embodiment of a calculation correction value according to a load, according to the disclosure.

In FIG. 13, a horizontal axis may represent a load applied to drive the display panel DP (refer to FIG. 3), and a vertical axis may represent a calculation correction value calculated in the calculation unit 130 (refer to FIG. 5).

Referring to FIGS. 5 and 13, the calculation unit 130 may calculate the calculation correction value OGL[N−1] by multiplying the calculated correction value CV[N−1] (refer to FIG. 11) by the weighted ratio GR.

An eighth graph GP8 may represent the calculation correction value OGL[N−1] according to the load LD[N−1]. The magnitude of the calculation correction value OGL[N−1] may vary depending on a value of the load LD[N−1]. In an embodiment, in FIG. 13, the calculation correction value OGL[N−1] may increase up to a predetermined load PLD_GP8 and then may decrease after the predetermined load PLD_GP8, for example.

Figure 14:
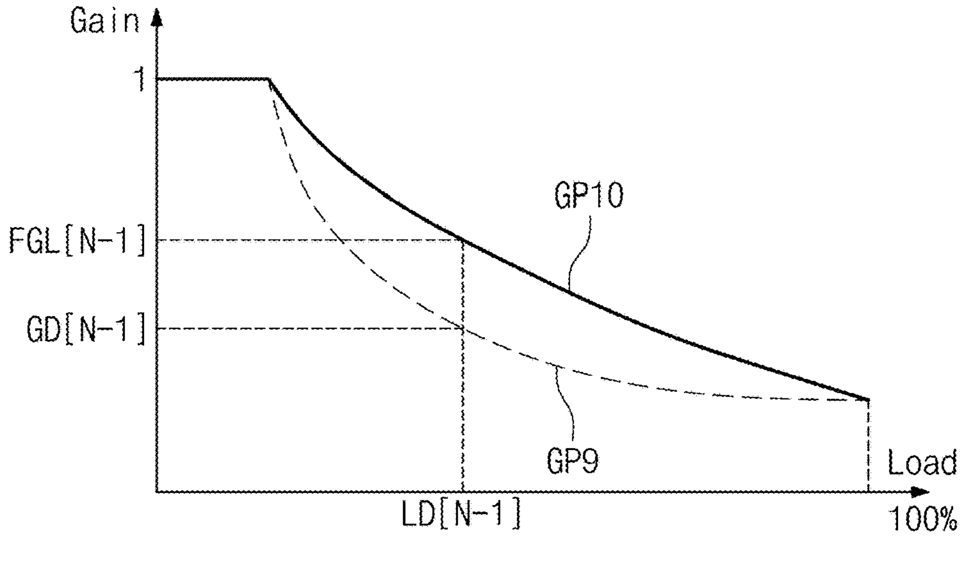
FIG. 14 is a graph showing an embodiment of a gain lookup table and a final gain according to a load, according to the disclosure.

FIG. 14 is a graph showing an embodiment of a gain lookup table and a final gain according to a load, according to the disclosure.

In FIG. 14, a horizontal axis represents the load LD[N−1], and a vertical axis may represent a gain applied to the data signal DS (refer to FIG. 3).

Referring to FIGS. 6 and 14, the gain setting unit 113 may output a reference gain GD[N−1] based on the load LD[N−1] and the gain lookup table GL. A ninth graph GP9 may represent the reference gain GD[N−1] according to the load LD[N−1]. The magnitude of the reference gain GD[N−1] may vary depending on a value of the load LD[N−1].

The gain calculation unit 114 may output the final gain FGL[N−1] by calculating the reference gain GD[N−1] and the calculation correction value OGL[N−1]. In an embodiment, the gain calculation unit 114 may be configured such that the maximum value is 1, by multiplying the reference gain GD[N−1] and the calculation correction value OGL [N−1], and may calculate the final gain FGL[N−1], for example. A tenth graph GP10 may represent the final gain FGL[N−1] according to the load LD[N−1]. The magnitude of the final gain FGL[N−1] may vary depending on a value of the load LD[N−1].

In FIG. 14, the final gain FGL[N−1] may be expressed as a solid line, and the reference gain GD[N−1] may be expressed as a dotted line. The final gain FGL[N−1] and the reference gain GD[N−1] may have a value smaller than or equal to 1. That is, each of the maximum value of the final gain FGL[N−1] and the reference gain GD[N−1] may be 1.

Figure 15:
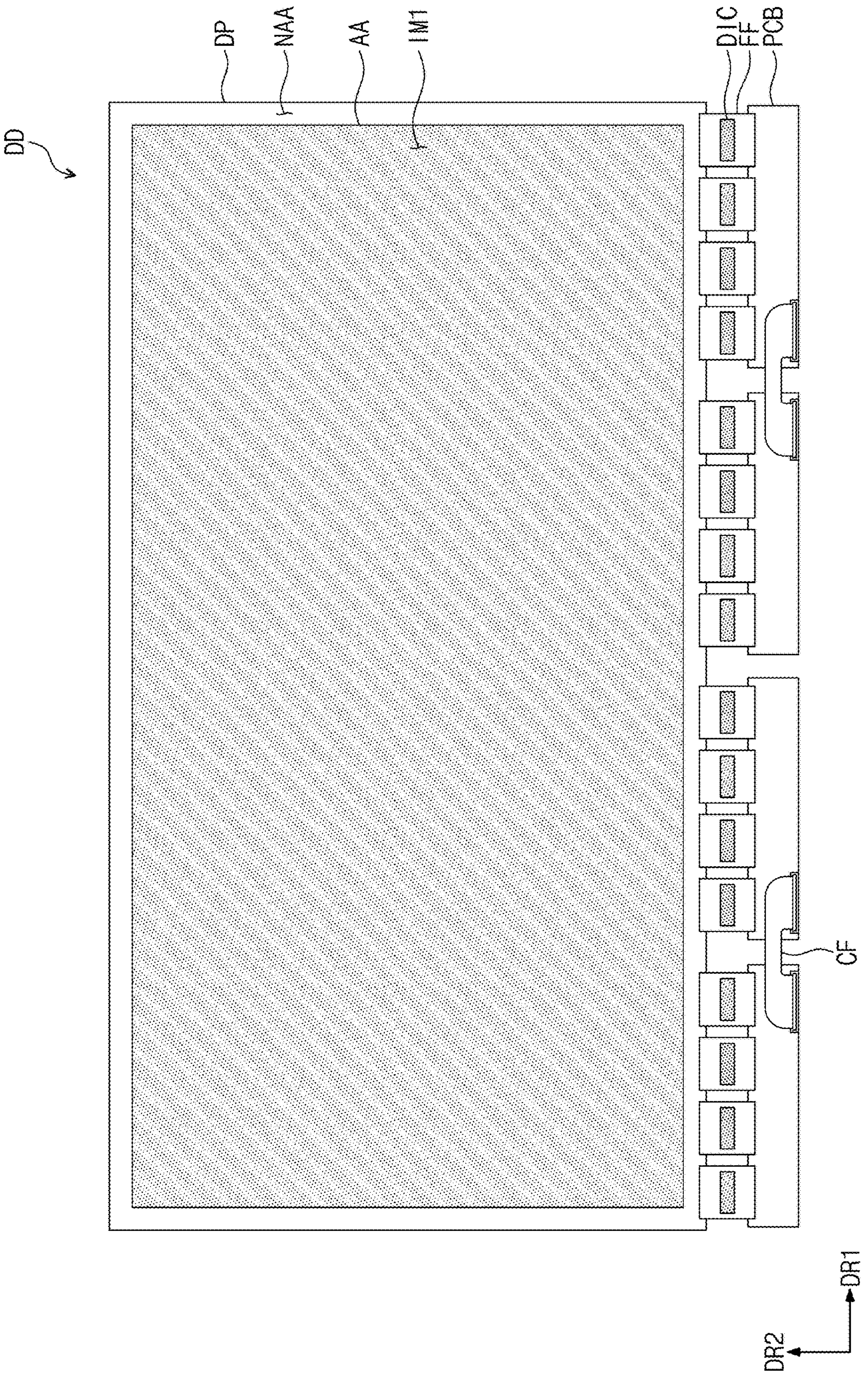
FIG. 15 is a diagram showing an embodiment of an image displayed on a display panel, according to the disclosure.
Figure 16:
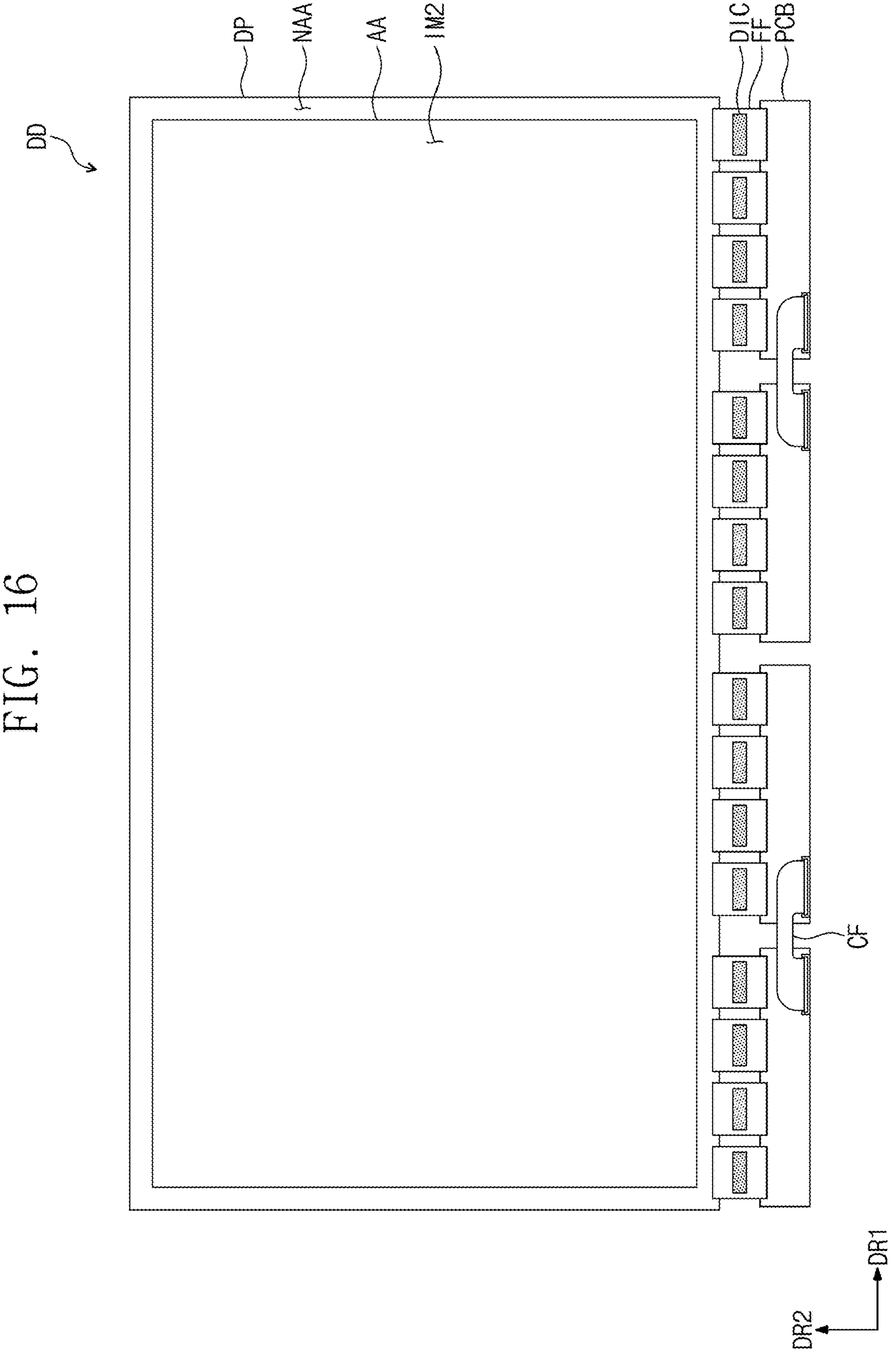
FIG. 16 is a diagram showing an embodiment of an image displayed on a display panel, according to the disclosure.

FIG. 15 is a diagram showing an embodiment of an image displayed on a display panel, according to the disclosure. FIG. 16 is a diagram showing an embodiment of an image displayed on a display panel, according to the disclosure. In the description of FIGS. 15 and 16, the same reference numerals are assigned to the same components described with reference to FIG. 2, and thus the descriptions thereof are omitted to avoid redundancy.

Referring to FIGS. 15 and 16, the image IM (refer to FIG. 1) may be displayed in the active area AA of the display panel DP in units of frame. In an embodiment, the image IM (refer to FIG. 1) may be displayed in the entirety of the area of the active area AA, for example. The image IM (refer to FIG. 1) may display a first image IM1 and a second image IM2. The first image IM1 may be first displayed in the active area AA, and then the second image IM2 may be displayed. The image signal RGB (refer to FIG. 5) of the first image IM1 may have a load of 100% and a grayscale of 32. The image signal RGB (refer to FIG. 5) of the second image IM2 may have a load of 100% and a grayscale of 255.

The display panel DP may further display a plurality of images in the active area AA between the first image IM1 and the second image IM2. The grayscale of each of the plurality of images may be increased gradually. In an embodiment, the grayscale of the first image IM1 displayed in the active area AA during a first frame may have the smallest value; the grayscale of each of the plurality of images displayed in the active area AA during second to (K−1)-th frames gradually increases; and, the grayscale of the second image IM2 displayed in the active area AA during a K-th frame may have the greatest value, for example. At this time, 'K' may be a positive integer greater than 2. In other words, the display panel DP may display images sequentially while increasing the grayscale from the first image IM1 to the second image IM2.

Figure 17:
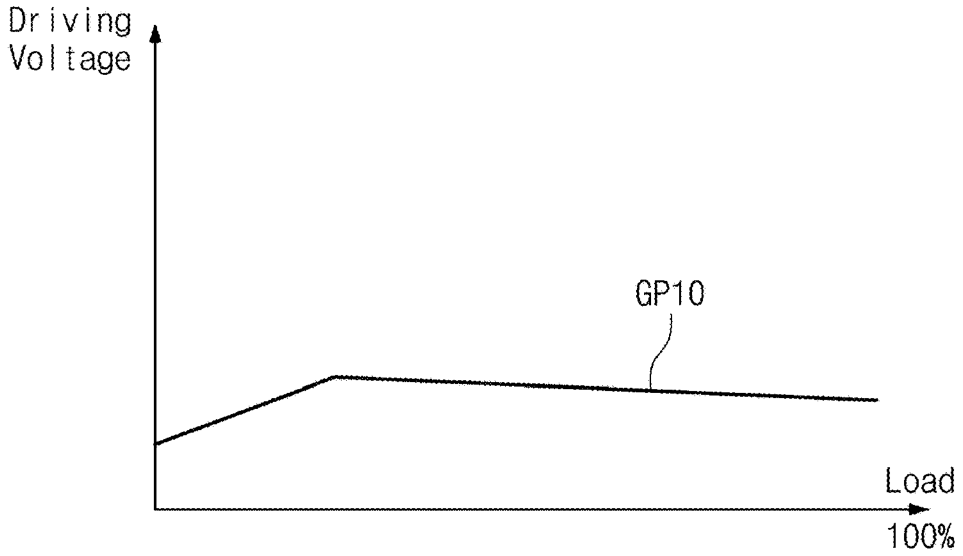
FIG. 17 is a graph showing an embodiment of a driving voltage, according to a load according to the disclosure.

FIG. 17 is a graph showing an embodiment of a driving voltage, according to a load according to the disclosure.

In FIG. 17, a horizontal axis may represent a load applied to drive the display panel DP (refer to FIG. 15), and a vertical axis may represent the first driving voltage ELVDD (refer to FIG. 4) provided to the pixel PXij (refer to FIG. 4).

Referring to FIGS. 3, 5, and 15 to 17, a tenth graph GP10 may represent a driving voltage for each load when the display panel DP sequentially displays the first image IM1 and the second image IM2. The driving voltage may be the first driving voltage ELVDD (refer to FIG. 4) for driving the display panel DP.

The second power controller 120 may analyze the image signal RGB and may output the driving voltage EVD[N−1] at the corresponding grayscale and corresponding load based on the driving voltage lookup table EVL for each grayscale and load. The voltage generator 300 may provide the first driving voltage ELVDD to the plurality of pixels PX depending on the voltage control signal VCS generated based on the driving voltage EVD[N−1]. In an embodiment, the first driving voltage ELVDD may have a value corresponding to the driving voltage EVD[N−1], for example.

In this case, in an embodiment in which the grayscale is sequentially changed from the first image IM1 to the second image IM2, the first driving voltage ELVDD provided to the plurality of pixels PX for each load may correspond to the tenth graph GP10.

Figure 18:
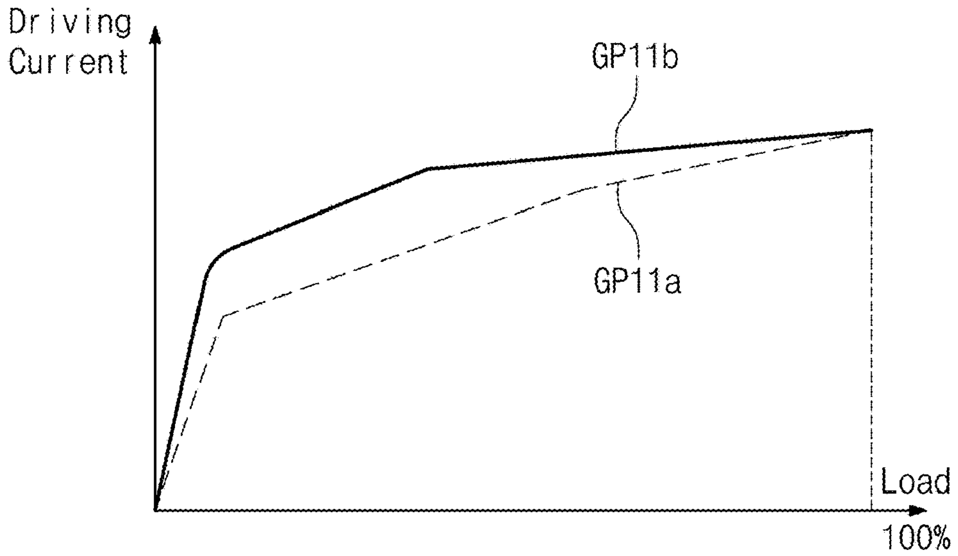
FIG. 18 is a graph showing an embodiment of a driving current according to a load, according to the disclosure.
Figure 19:
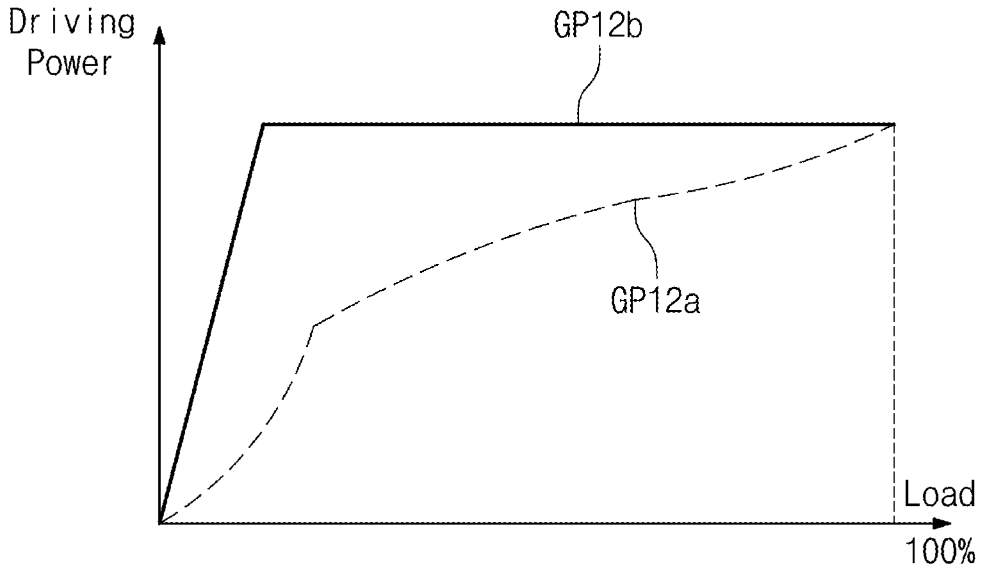
FIG. 19 is a graph showing an embodiment of driving power according to a load, according to the disclosure.

FIG. 18 is a graph showing an embodiment of a driving current according to a load, according to the disclosure. FIG. 19 is a graph showing an embodiment of driving power according to a load, according to the disclosure.

In FIG. 18, a horizontal axis may represent a load applied to drive the display panel DP (refer to FIG. 15), and a vertical axis may represent a driving current.

In FIG. 19, a horizontal axis may represent a load applied to drive the display panel DP (refer to FIG. 15), and a vertical axis may represent driving power.

Referring to FIGS. 5, 6, and 15 to 19, the calculation unit 130 may receive the load LD[N−1], the driving voltage EVD[N−1], the reference driving current ID[N−1], and the weighted ratio GR.

The calculation unit 130 may calculate a value of the driving power PW[N−1] according to the load LD[N−1] during one frame by multiplying a value of the reference driving current ID[N−1] and a value of the driving voltage EVD[N−1] according to the load LD[N−1].

The calculation unit 130 may further receive the maximum power data value MXP. The allowable driving power value according to the load LD[N−1] may be calculated by subtracting the value of the driving power PW[N−1] according to the load LD[N−1] from the value of the maximum power data value MXP. The calculation unit 130 may calculate the additional driving current AID[N−1] according to the load LD[N−1] by dividing the driving voltage EVD [N−1] value by the allowable driving power.

The calculation unit 130 may generate a correction value CV[N−1] according to the load LD[N−1] based on the value of the additional driving current AID[N−1]. The calculation unit 130 may calculate the calculation correction value OGL[N−1] according to the load LD[N−1] by multiplying the correction value CV[N−1] by the correction ratio according to the load LD[N−1]. The calculation unit 130 may transmit the calculation correction value OGL[N−1] to the gain calculation unit 114 of the first power controller 110.

In the meantime, the gain setting unit 113 of the first power controller 110 may output the reference gain GD[N−1] according to the load LD[N−1] to the gain calculation unit 114 based on the load LD[N−1] of the image signal RGB of the (N−1)-th frame, and the gain lookup table GL.

The gain calculation unit 114 may calculate the final gain FGL[N−1] according to the load LD[N−1] based on the reference gain GD[N−1] and the calculation correction value OGL[N−1], which are received. The final gain FGL[N−1] may have a value greater than the reference gain GD[N−1]. The gain calculation unit 114 may transmit the final gain FGL[N−1] to the data output unit 140.

The data output unit 140 may output the data signal DS of the N-th frame obtained by adjusting the grayscale level of the input image RGB of the N-th frame based on the final gain FGL[N−1].

The data driver 200 (refer to FIG. 3) may receive the data signal DS and may convert the data signal DS into the pixel data signal Di (refer to FIG. 4). The magnitude of the driving current Ids (refer to FIG. 4) may be adjusted by the pixel data signal Di (refer to FIG. 4). The pixel data signal Di (refer to FIG. 4) may adjust the luminance of the display panel DP by adjusting the magnitude of the driving current Ids (refer to FIG. 4). In other words, the luminance of the display panel DP may be adjusted based on the final gain FGL[N−1].

When the display panel DP according to the comparative example of the disclosure displays the first image IM1 and the second image IM2, unlike an embodiment of the disclosure, the data output unit 140 may output a data signal obtained by adjusting the grayscale level of the input image RGB based on the reference gain GD[N−1] rather than the final gain FGL[N−1]. When the plurality of pixels PX are driven based on the data signal, the driving current of each of the plurality of pixels PX may have a value corresponding to a 11*a*-th graph GP11*a*. In this case, the driving power of the display panel DP may have a value corresponding to a 12*a*-th graph GP12*a*. The 12*a*-th graph GP12*a* may be obtained by multiplying the tenth graph GP10 and the 11*a*-th graph GP11*a*.

When the display panel DP in an embodiment of the disclosure displays the first image IM1 and the second image IM2, the data output unit 140 may output the data signal DS obtained by adjusting the grayscale level of the input image RGB based on the final gain FGL[N−1]. When the plurality of pixels PX are driven based on the data signal DS, the driving current Ids (refer to FIG. 4) of each of the plurality of pixels PX may have a value corresponding to a 11*b*-th graph GP11*b*. In this case, the driving power of the display panel DP may have a value corresponding to a 12*b*-th graph GP12*b*. The 12*b*-th graph GP12*b* may be obtained by multiplying the tenth graph GP10 and the 11*b*-th graph GP11*b*.

In an embodiment of the disclosure, because the 11*b*-th graph GP11*b* may have a greater value than that of the 11*a*-th graph GP11*a* for the same load. Accordingly, the display panel DP (refer to FIG. 3) may have higher luminance when adjusting the grayscale level of the input image RGB based on the final gain FGL[N−1] rather than based on the reference gain GD[N−1]. Moreover, because the 12*b*-th graph GP12*b* has a greater value than that of the 12*a*-th graph GP12*a* for the same load, the luminance of each of the plurality of pixels PX (refer to FIG. 3) may be increased by utilizing the maximum power value at which the display panel DP (refer to FIG. 3) is capable of being driven. Accordingly, the display device DD (refer to FIG. 1) with improved display quality may be provided.

Although an embodiment of the disclosure has been described for illustrative purposes, those skilled in the art will appreciate that various modifications, and substitutions are possible, without departing from the scope and spirit of the disclosure as disclosed in the accompanying claims.

Accordingly, the technical scope of the disclosure is not limited to the detailed description of this specification, but should be defined by the claims.

As described above, a driving controller may calculate a final gain and may adjust a data signal based on the final gain. The data signal may be transmitted to a data driver to generate a pixel data signal. The magnitude of a driving current may be adjusted by the pixel data signal. In other words, the magnitude of the driving current may be adjusted through the data signal adjusted by the final gain. The driving current adjusted through the final gain may maximally utilize the power of a display panel. As a result, the luminance of the display panel may be improved. Accordingly, a display device with improved display quality may be provided.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A display device comprising:

a display panel including a plurality of pixels; and a driving controller which receives an image signal, outputs a data signal, and drives the plurality of pixels, the driving controller including:

a first power controller which receives the image signal and outputs a load of a (N−1)-th image signal based on the image signal, N being a natural number of two or more;

a second power controller which receives the image signal and outputs a driving voltage of the (N−1)-th image signal based on the image signal;

a calculation circuit which receives the load, the driving voltage, and a maximum power data value, and outputs a calculation correction value for controlling a driving current of each of the plurality of pixels; and a data output circuit which outputs the data signal, which is obtained by adjusting a grayscale level of the image signal, based on the load, the driving voltage, and the calculation correction value.

2. The display device of claim 1, wherein the second power controller further receives a driving voltage lookup table and outputs the driving voltage based on the driving voltage lookup table.

3. The display device of claim 1, wherein the calculation circuit further receives a driving current lookup table including a reference driving current corresponding to the load, and a weighted ratio including a correction ratio corresponding to the load.

4. The display device of claim 3, wherein the calculation circuit outputs the reference driving current based on the driving current lookup table, and wherein the calculation circuit calculates driving power by multiplying the reference driving current and the driving voltage.

5. The display device of claim 4, wherein the calculation circuit further calculates allowable driving power by subtracting the driving power from the maximum power data value.

6. The display device of claim 5, wherein the calculation circuit further calculates an additional driving current based on a value obtained by dividing the driving voltage from the allowable driving power.

7. The display device of claim 6, wherein the calculation circuit extracts a correction value based on the additional driving current.

8. The display device of claim 7, wherein the calculation circuit further calculates the calculation correction value by multiplying the correction value by the weighted ratio.

9. The display device of claim 1, wherein the first power controller further receives a gain lookup table and the calculation correction value, and outputs a final gain based on the gain lookup table and the calculation correction value.

10. The display device of claim 9, wherein the first power controller includes:

a load calculation circuit which calculates a sum of all grayscales based on the image signal;

a load representative value calculation circuit which calculates the load based on the sum of the all grayscales;

a gain setting circuit which outputs a reference gain based on the load and the gain lookup table; and a gain calculation circuit which outputs the final gain by calculating the reference gain and the calculation correction value.

11. A driving controller comprising:

a first power controller which receives an image signal and outputs a load of a (N−1)-th image signal based on the image signal, N being a natural number of two or more;

a second power controller which receives the image signal and outputs a driving voltage of the (N−1)-th image signal based on the image signal; and a calculation circuit which receives the load, the driving voltage, and a maximum power data value and outputs a calculation correction value for controlling a driving current flowing on a display panel.

12. The driving controller of claim 11, wherein the first power controller receives a gain lookup table and the calculation correction value, and outputs a final gain based on the gain lookup table and the calculation correction value.

13. The driving controller of claim 12, further comprising:

a data output circuit, wherein the data output circuit outputs a data signal obtained by adjusting a grayscale level of the image signal, based on the final gain.

14. The driving controller of claim 11, wherein the second power controller further receives a driving voltage lookup table and outputs the driving voltage based on the driving voltage lookup table.

15. The driving controller of claim 11, wherein the calculation circuit further receives a driving current lookup table including a driving current value corresponding to the load, and a weighted ratio including a correction ratio corresponding to the load.

16. The driving controller of claim 15, wherein the calculation circuit outputs the driving current value based on the driving current lookup table, and wherein the calculation circuit calculates driving power by multiplying the driving current value and the driving voltage.

17. The driving controller of claim 16, wherein the calculation circuit further calculates allowable driving power by subtracting the driving power from the maximum power data value.

18. The driving controller of claim 17, wherein the calculation circuit further calculates an additional driving current based on a value obtained by dividing the driving voltage from the allowable driving power.

19. The driving controller of claim 18, wherein the calculation circuit extracts a correction value based on the additional driving current.

20. The driving controller of claim 19, wherein the calculation circuit further calculates the calculation correction value by multiplying the correction value by the weighted ratio.

* * * * *